(12) United States Patent
Dowty et al.

(10) Patent No.: US 11,498,681 B2
(45) Date of Patent: Nov. 15, 2022

(54) INTEGRATED SEATING ARMREST, STOWAGE AND BED SURFACE

(71) Applicant: B/E Aerospace, Inc., Winston-Salem, NC (US)

(72) Inventors: Mark B. Dowty, Rural Hall, NC (US); Martti Johannes Lampela, Woodland Hills, CA (US); Adil Mumdood Ali, Newbury Park, CA (US); Garen P. Moreno, Ojai, CA (US); Suzuko Hisata, Atlanta, GA (US); Robert J. Henshaw, Newnan, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 273 days.

(21) Appl. No.: 16/742,532

(22) Filed: Jan. 14, 2020

(65) Prior Publication Data
US 2021/0214086 A1 Jul. 15, 2021

(51) Int. Cl.
*B64D 11/06* (2006.01)

(52) U.S. Cl.
CPC ...... *B64D 11/0605* (2014.12); *B64D 11/0624* (2014.12); *B64D 11/0636* (2014.12);
(Continued)

(58) Field of Classification Search
CPC ............ B64D 11/0605; B64D 11/0624; B64D 11/0636; B64D 11/0638; B64D 11/0644; B64D 11/0641; B60N 2/757
See application file for complete search history.

(56) References Cited

U.S. PATENT DOCUMENTS

| 5,720,514 A * | 2/1998 | Carlsen .................. B60N 3/107 297/188.1 |
| 6,375,119 B2 | 4/2002 | Park et al. |

(Continued)

FOREIGN PATENT DOCUMENTS

| AU | 2007253094 B2 | 11/2007 |
| DE | 102014110819 A1 | 2/2016 |

(Continued)

OTHER PUBLICATIONS

Extended Search Report for European Application No. 21150959.1 dated May 19, 2021, 9 pages.

(Continued)

*Primary Examiner* — Richard Green
*Assistant Examiner* — Madison Elizabeth Dittner
(74) *Attorney, Agent, or Firm* — Suiter Swantz pc llo

(57) ABSTRACT

An aircraft seat for an aircraft passenger compartment suite is disclosed. In embodiments, the aircraft seat includes a primary section including a primary seatback portion and a primary seat base portion, and an auxiliary section including an auxiliary seatback portion and an auxiliary seat base portion. In embodiments, the aircraft seat may further include an actuatable element configured to actuate between an open position and a closed position. The actuatable element may include a first surface which defines at least a portion of the auxiliary seatback portion when the actuatable element is in the closed position, and a second surface which defines a surface of an armrest when the actuatable element is in the open position.

15 Claims, 11 Drawing Sheets

(52) U.S. Cl.
CPC ...... B64D 11/0638 (2014.12); B64D 11/0641 (2014.12); B64D 11/0644 (2014.12)

(56) References Cited

U.S. PATENT DOCUMENTS

| | | | |
|---|---|---|---|
| 6,508,508 B1* | 1/2003 | Bargiel | B60N 2/793 |
| | | | 297/188.16 |
| 7,946,532 B2 | 5/2011 | Martin | |
| 8,662,447 B2 | 3/2014 | Johnson et al. | |
| 8,931,834 B2 | 1/2015 | Wallace et al. | |
| 8,998,313 B2* | 4/2015 | Reh | B60N 2/3045 |
| | | | 297/188.1 |
| 9,022,320 B2 | 5/2015 | Wallace et al. | |
| 9,033,413 B2 | 5/2015 | Round et al. | |
| 9,126,689 B2* | 9/2015 | Porter | B60N 3/004 |
| 10,081,278 B1* | 9/2018 | Balzer | B60N 2/60 |
| 10,189,389 B2* | 1/2019 | Jakubec | B60N 2/757 |
| 10,358,220 B2 | 7/2019 | Carlioz | |
| 2020/0172249 A1* | 6/2020 | Wesseloh | B64D 11/0601 |

FOREIGN PATENT DOCUMENTS

| | | | |
|---|---|---|---|
| EP | 3174792 A1 | 6/2017 | |
| EP | 3564126 A1 | 11/2019 | |
| EP | 3572325 A1 | 11/2019 | |
| EP | 3398854 B1 | 5/2020 | |
| FR | 3049577 A1 | 10/2017 | |
| WO | 2006054104 A1 | 5/2006 | |
| WO | WO-2016016326 A1 * | 2/2016 | ......... B64D 11/0636 |
| WO | 2019179638 A1 | 9/2019 | |

OTHER PUBLICATIONS

Office Action in European Application No. 21150959.1, dated Jan. 1, 2022, 4 pages.

* cited by examiner

INTEGRATED SEATING ARMREST, STOWAGE AND BED SURFACE

BACKGROUND

In commercial transportation vehicles such as passenger aircraft, an aircraft passenger compartment suite may include one or more aircraft seats. Some aircraft passenger seats may be designed for a primary occupying passenger, as well as a guest passenger to visit the aircraft passenger compartment suite during flight. Accordingly, there is a need for configurable and integrated structures which may facilitate various surfaces dependent upon the position of the aircraft passenger seat and the needs of the primary occupying passenger.

SUMMARY

An aircraft seat for an aircraft passenger compartment suite is disclosed. In embodiments, the aircraft seat includes a primary section including a primary seatback portion and a primary seat base portion, and an auxiliary section including an auxiliary seatback portion and an auxiliary seat base portion. In embodiments, the aircraft seat may further include an actuatable element configured to actuate between an open position and a closed position. The actuatable element may include a first surface which defines at least a portion of the auxiliary seatback portion when the actuatable element is in the closed position, and a second surface which defines a surface of an armrest when the actuatable element is in the open position.

In some embodiments of the aircraft seat, the first surface is at least partially defined by a dress cover.

In some embodiments of the aircraft seat, the second surface includes dress cover surface defining the surface of the armrest.

In some embodiments of the aircraft seat, at least a portion of the second surface is defined by a desk surface made up of at least one of a plastic, wood, or metal surface.

In some embodiments of the aircraft seat, the second surface includes a cup holder.

In some embodiments of the aircraft seat, the first surface of the actuatable element is substantially flush with the primary seatback portion when the actuatable element is in the closed position.

In some embodiments of the aircraft seat, the actuatable element configured to pivot between the open position and the closed position.

In some embodiments of the aircraft seat, the aircraft seat further includes a stowage compartment disposed within the auxiliary seatback portion.

In some embodiments of the aircraft seat, the actuatable element is configured to provide access to the stowage compartment when the actuatable element is in the open position.

In some embodiments of the aircraft seat, the stowage compartment configured to house at least one of one or more passenger amenities, one or more electronic connections for one or more passenger amenities, one or more electronic connections in communication with one or more components of the aircraft passenger compartment suite, or one or more safety devices.

In some embodiments of the aircraft seat, the actuatable element is separated from the auxiliary seat base portion by a gap.

In some embodiments of the aircraft seat, the auxiliary seat base portion extends past the primary seatback portion a distance equivalent to a depth of the gap.

In some embodiments of the aircraft seat, a width of the actuatable element is equal to a width of the auxiliary seatback portion.

In some embodiments of the aircraft seat, a width of the actuatable element is less than a width of the auxiliary seatback portion.

An aircraft seat for an aircraft passenger compartment suite is disclosed. In embodiments, the aircraft seat includes an auxiliary section disposed adjacent to a primary section of the aircraft seat. In embodiments, the auxiliary section includes an auxiliary seatback portion including a first actuatable element disposed within the auxiliary seatback portion configured to actuate between an open position and a closed position, the first actuatable element configured to provide access to a first stowage compartment when the first actuatable element is in the open position. In embodiments, the auxiliary section further includes an auxiliary seat base section including a second actuatable element, the second actuatable element configured to actuate between an open position and a closed position, the second actuatable element configured to provide access to a second stowage compartment when the second actuatable element is in the open position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
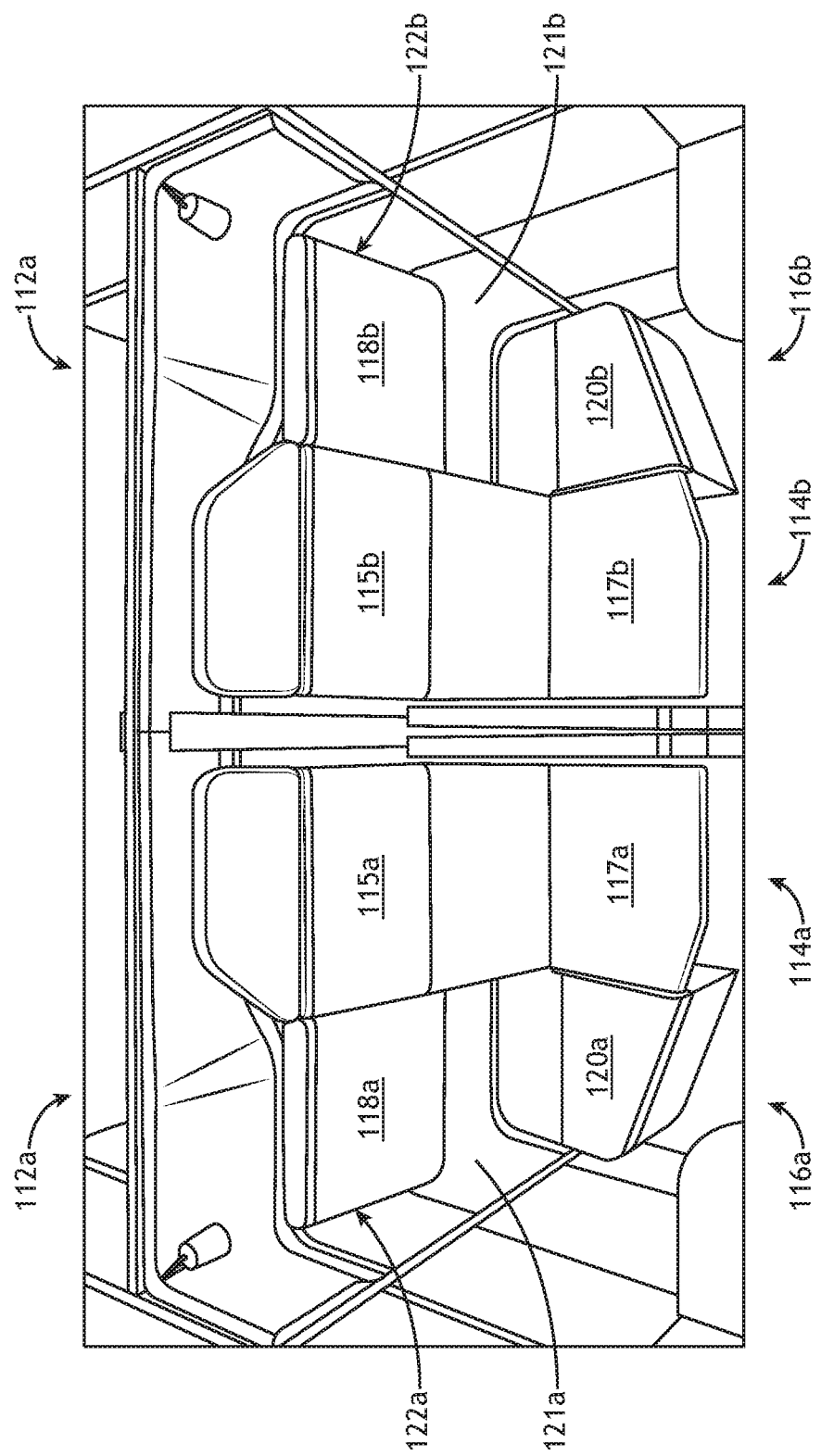
FIG. 1A illustrates an aircraft seat 112 including an actuatable element 122 in a stowed position, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-5 generally illustrate an aircraft passenger compartment suite including a bench-back aircraft seat, in accordance with one or more embodiments of the disclosure.

In commercial transportation vehicles such as passenger aircraft, an aircraft passenger compartment suite may include one or more aircraft seats. The aircraft seat may be designed for a primary occupying passenger, but there may be a desire for a guest passenger to visit the aircraft passenger compartment suite during flight, which may require additional seating, such as an auxiliary seating section. However, there is a need in the art for configurable and integrated structures which may facilitate various surfaces dependent upon the position of the aircraft passenger seat and the needs of the primary occupying passenger. For example, in instances where only the primary occupying passenger is seated within the aircraft passenger seat, the primary occupying passenger may require surfaces/structures for an armrest, stowage, or bed surface (e.g., when in a bed or lie-flat position for use by the primary passenger). Conversely, in instances where a guest passenger visits the primary aircraft passenger, there may be a need for additional seatback surfaces and/or additional bed surfaces.

Accordingly, embodiments of the present disclosure are directed to an actuatable element of a seat (e.g., aircraft passenger seat) which is configured to provide integrated stowage, seating surfaces, armrest surfaces, and bed surfaces. In embodiments, the actuatable element may be configured to serve varying purposes dependent upon the configuration/position of the actuatable element itself, as well as the configuration/position of the aircraft passenger seat.

Figure 1B:
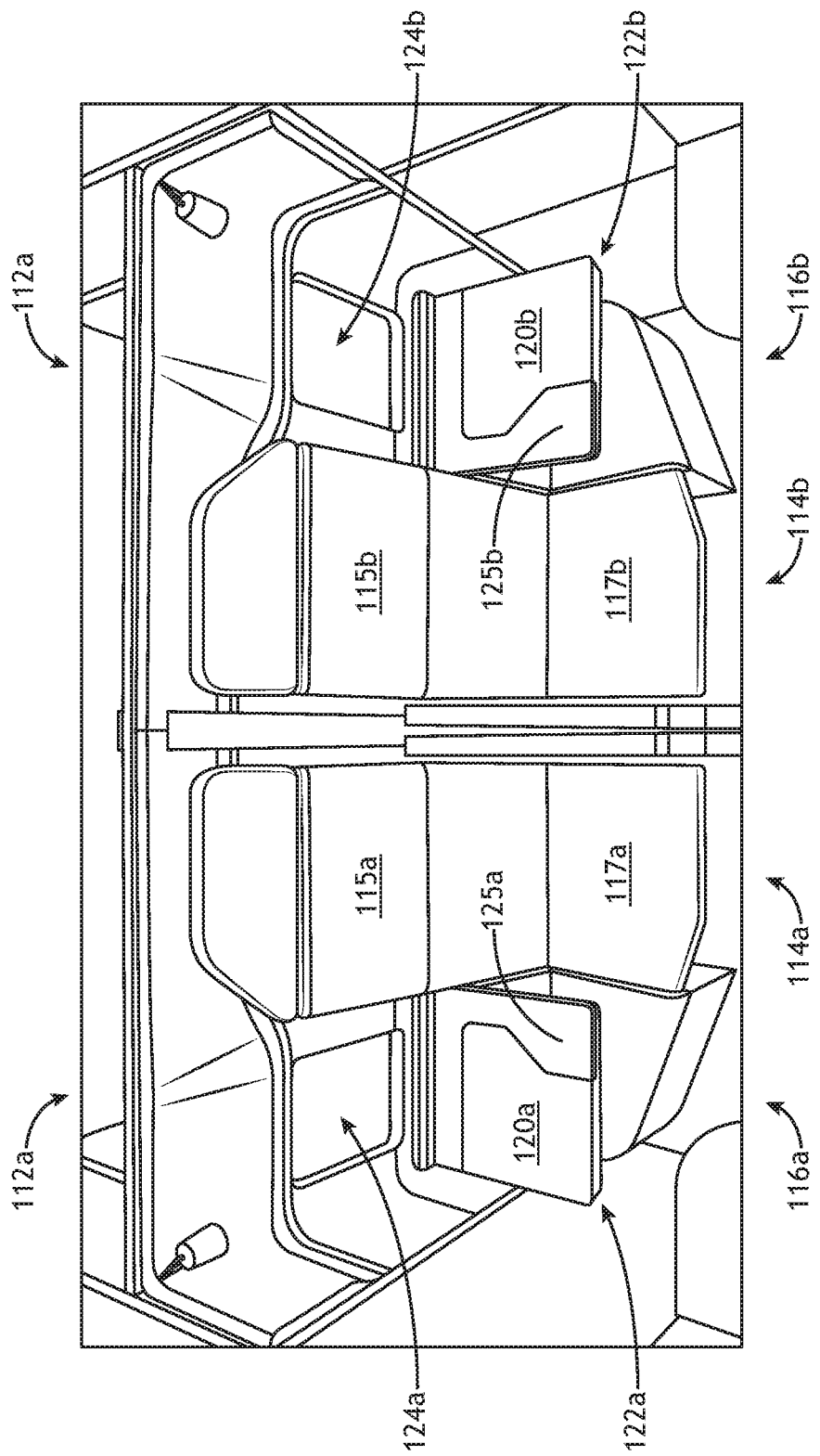
FIG. 1B illustrates an aircraft seat 112 including an actuatable element 122 in a deployed position, in accordance with one or more embodiments of the disclosure.

FIG. 1A illustrates an aircraft seat 112a, 112b including an actuatable element 122a, 122b in a closed position (stowed position), in accordance with one or more embodiments of the disclosure. FIG. 1B illustrates an aircraft seat 112 including an actuatable element 122 in an open position (deployed position), in accordance with one or more embodiments of the disclosure.

While embodiments of the present disclosure are shown and described primarily in the context of an aircraft environment, this is not to be regarded as a limitation of the present disclosure, unless noted otherwise herein. In this regard, it is contemplated herein that the actuatable element 122 of the present disclosure may be incorporated into any seat known in the art including, but not limited to, terrestrial vehicle seats (e.g., vans, busses, trains), aquatic vehicle seats (e.g., boats), commercial vehicles, military vehicles, and the like. By way of another example, the actuatable element 122 may be incorporated in non-vehicle-based environments, such as commercial building seats, residential seats, movie theatres, and the like.

In embodiments, an aircraft seat 112a, 112b may include one or more aircraft seat sections. For example, a first aircraft seat 112a may include a primary section 114a and an auxiliary section 116a, and a second aircraft seat 112b may include a primary section 114b and an auxiliary section 116b. By way of another example, the aircraft seat 112a, 112b may include a single section. Generally, the aircraft seat 112 may include any number of sections.

As illustrated in FIG. 1A, the primary section 114a, 114b and the auxiliary section 116a, 116b of the aircraft seat 112a, 112b may form a wide seating area or surface when the aircraft seat 112a, 112b is in the upright position, such that the aircraft seat 112a, 112b may be considered to include a bench-back. The wide seating area or surface may be configured to seat one or more passengers. Each of the primary sections 114a, 114b may be configured to seat a passenger, and each auxiliary section 116a, 116b may be configured to seat a guest passenger when the aircraft seat 112a, 112b is in the upright position (e.g., may operate as a buddy seat). It is noted herein the increased width of the aircraft seat 112a, 112b may provide for each aircraft seat 112a, 112b to be used as a shared seat which is shared between a primary passenger and a guest passenger.

In embodiments, the primary section 114a, 114b may be at least partially defined by a primary seatback portion 115a, 115b and a primary seat base portion 117a, 117b. Similarly, the auxiliary section 116a, 116b may be at least partially defined by an auxiliary seatback portion 118a, 118b and an auxiliary seat base portion 120a, 120b. In embodiments, the primary seat base portion 117a, 117b may be substantially parallel and/or flush with the auxiliary seat base portion 120a, 120b. In this regard, the primary seat base portion 117a, 117b and the auxiliary seat base portion 120a, 120b may come together to form a combined seat base portion configured to provide seating for primary passenger and a guest passenger.

In some embodiments, the primary seatback portions 115a, 115b may be substantially parallel and/or flush with the auxiliary seatback portions 118a, 118b. Accordingly, as shown in FIG. 1A, the seatback portions (e.g., primary seatback portions 115a, 115b, auxiliary seatback portions 118a, 118b) may define a continuous seatback surface for the a primary passenger and/or a guest passenger. In additional and/or alternative embodiments, the auxiliary seatback portions 118a, 118b may be oriented at an angle with respect to the primary seatback portions 115a, 115b such that the combined seating surface defined by the primary seatback portions 115a, 115b and auxiliary seatback portions 118a, 118b is not planar. For example, the primary seatback portions 115a, 115b and/or auxiliary seatback portions 118a, 118b may be curved such that the combined seatback surface is curved.

In embodiments, the aircraft seat 112a, 112b may include an actuatable element 122a, 122b disposed within the auxiliary seatback portions 118a, 118b. In some embodiments, the actuatable member 122a, 122b may define substantially all of the auxiliary seatback portions 118a, 118b, such that the actuatable member 122a, 122b extends substantially all the way to the auxiliary seat base portions 120a, 120b. In additional and/or alternative embodiments, the actuatable member 122a, 122b may be separated/spaced from the auxiliary seat base portions 120a, 120b by a gap 121a, 121b or space. For example, as shown in FIG. 1A, a gap 121a, 121b may exist between the auxiliary seat base portion 120a, 120b and each respective actuatable element 122a, 122b. The gap 121a, 121b may include an air gap, a gap configured to hold a pillow for a passenger when the aircraft seat 112a, 112b is in a lie-flat position, and the like.

In addition, it is noted herein the gap 121a, 121b may contribute to the wide lie-flat area or surface providing increased width for portions of a passenger's upper body (e.g., torso, arms, shoulders, head, or the like) when the aircraft seat 112a, 112b is in a lie-flat position. In this regard, as shown in FIG. 1A, the auxiliary seat base portion 120a, 120b may be deeper than the primary seat base portion 117a, 117b in that the auxiliary seat base portion 120a, 120b extends past the primary seatback portion 115a, 115b and/or the auxiliary seatback portion 118a, 118b. For example, the auxiliary seat base portion 120a, 120b may extend past the primary seatback portion 115a, 115b a distance which is equivalent to a depth of the gap 121a, 121b.

In embodiments, the actuatable element 122a, 122b may be selectively actuated between a closed position (e.g., stowed position), as shown in FIG. 1A, and an open position (e.g., deployed position), as shown in FIG. 1B. The actuatable element 122a, 122b may be configured to be selectively actuated between at least the open position and the closed position via any mechanism known in the art. For example, the actuatable element 122a, 122b may be pivotably coupled to the aircraft seat 112 (e.g., primary section 114a, 114b and/or auxiliary section 116a, 116b) via a simple pivoting assembly. In some embodiments, as will be described in further detail herein, the actuatable assembly 122a, 122b may be manually actuated, automatically actuated via electrical control signals, and the like.

The auxiliary section 116a, 116b of the aircraft seat 112a, 112b may be coupled to the primary section 114a, 114b of the aircraft seat 112a, 112b. For example, the auxiliary section 116a, 116b of the aircraft seat 112a, 112b may include a full-length back coupled to the primary section 114 of the aircraft seat 112, where the entire full-length back actuates as a single section. By way of another example, the auxiliary section 116 of the aircraft seat 112 may include the auxiliary seat base portion 120 coupled to the primary section 114 of the aircraft seat 112 and the auxiliary seatback portion 118 (e.g., a portion including the actuatable element 122 and/or the stowage compartment 124) coupled to a privacy shell element 108 proximate to the aircraft seat 112, where the auxiliary seat base portion 120 and the auxiliary seatback portion 118 are split. For instance, the split may (non-limitingly) be along a horizontal or substantially horizontal line. In addition, the auxiliary seat base portion 120 of the auxiliary section 116 of the aircraft seat 112 may abut or be proximate to the auxiliary seatback portion 118 of the auxiliary section 116 of the aircraft seat 112 when the aircraft seat 112 is in the upright position.

In some embodiments, the actuatable element 122a, 122b may at least partially define the auxiliary seatback portion 118a, 118b when the actuatable element 122a, 122b is in the stowed (e.g., closed) position. For example, as shown in FIG. 1A, the actuatable element 122a, 122b may include a first surface which defines at least a portion of the auxiliary seatback 118a, 118b when the actuatable element 122a, 122b is in the stowed (e.g., closed) position. In embodiments, the first surface of the actuatable element 122a, 122b which defines at least a portion of the auxiliary seatback portion 118a, 118b may be at least partially defined by a dress cover. The dress cover defining at least a portion of the first surface of the actuatable element 122a, 122b may include a similar dress cover material as a dress cover which defines other surfaces of the aircraft seat 112 (e.g., primary seatback portion 115a, 115b, primary seat base portion 117a, 117b, auxiliary seat base portions 120a, 120b). As noted previously herein, the first surface of the actuatable element 122a, 122b may be flush, or substantially flush, with the primary seatback portion 115a, 115b and/or a remainder of the auxiliary seatback portion 118a, 118b when the actuatable element 122a, 122b is in the closed position.

In embodiments, the actuatable element 122a, 122b may include several surfaces which may be used by a passenger seated in the primary section 114a, 114b when the actuatable element 122a, 122b is in the open position. For example, as shown in FIG. 1B, the actuatable element 122a, 122b may include a second surface when the actuatable element 122a, 122b is in the open position. In some embodiments, the second surface may define a surface of an armrest 125a, 125b. The armrest 125a, 125b making up at least a portion of the second surface of the actuatable element 122a, 122b may be defined/covered by a dress cover in order to provide a soft, comfortable surface for the passenger to rest their arms and elbows.

In additional and/or alternative embodiments, the second surface of the actuatable element 122a, 122b may further include a desk surface 127a, 127b. For example, as shown in FIG. 1B, at least a portion of the second surface of the actuatable element 122a, 122b may include a desk surface 127a, 127b. The desk surface 127a, 127b may be fabricated from any material known in the art including, but not limited to, plastic, wood, metal, and the like. In some embodiments, the second surface of the actuatable element 122a, 122b may include additional and/or alternative features which may be used by a passenger when the actuatable element 122a, 122b is in the open position. For example, the second surface of the actuatable element 122a, 122b may further include one or more cupholders disposed within the second surface.

In embodiments, the aircraft seat 112a, 112b may include one or more stowage compartments 124a, 124b disposed within the auxiliary seatback portion 118a, 118b. In embodiments, the actuatable element 122a, 122b may be configured to be actuated in order to provide a passenger access to the stowage compartment 124a, 124b. For example, as shown in FIG. 1B, the actuatable element 122a, 122b may be configured to provide access to the stowage compartment 124a, 124b when the actuatable element 122a, 122b is in the open position.

In embodiments, the stowage compartment 124a, 124b may be configured to receive and/or house (e.g., contain, secure, hold, or the like) one or more passenger amenities including, but not limited to, one or more pieces of carry-on luggage, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like. For example, in some embodiment, the stowage compartment 124a, 124b may include a refrigerated/chilled compartment configured to store and chill beverages and/or food products. In addition, it is noted herein that one or more of the stowage compartments 124 may include one or more electronic connections for one or more passenger amenities such as, but not limited to, one or more charging ports, one or more charging cables, display device connection ports, audio output jacks (e.g., headphone jacks), audio input jacks, or the like. Further, it is noted herein that one or more of the stowage compartments 124, 204, 212, 302 may include one or more safety devices (e.g., air masks, personal floatation devices, or the like).

FIGS. 2A-4C illustrate an aircraft passenger compartment suite 100, in accordance with one or more embodiments of the disclosure.

As illustrated in at least FIGS. 2A-2F, the aircraft passenger compartment suite 100 may include one or more sides. For example, the aircraft passenger compartment suite 100 may include a side 102 and a side 104 separated by a privacy divider 106. The aircraft passenger compartment suite 100 may include one or more passenger compartments 100a. For example, the aircraft passenger compartment suite 100 may include one or more passenger compartments 100a within the side 102 and/or one or more passenger compartments 100a within the side 104.

The aircraft passenger compartment suite 100 may include a privacy shell with one or more privacy shell elements 108. The privacy shell may include an opening 110 within the one or more privacy shell elements 108 into the side 102 and/or the side 104. The aircraft passenger compartment suite 100 may include a door for the opening 110. For example, the door may swing or slide into an open position against a privacy shell element 108. By way of another example, a privacy shell element 108 may be at least partially hollow, and the door may be slid into a stowage compartment defined in the one or more privacy shell elements 108.

The side 102 and/or the side 104 may include one or more aircraft seats 112. For example, the side 102 and/or the side 104 may include one aircraft seat 112. By way of another example, the side 102 and/or the side 104 may include two aircraft seats 112. A privacy shell element 108 proximate to the aircraft seat 112 may be configured to conform to at least a part of an aircraft seat 112.

The aircraft seat 112 may be translatable (e.g., trackable or slidable). The aircraft seat 112 may be rotatable about an axis cross-wise through the aircraft seat 112 into a position including, but not limited to, an upright or raised position, one or more reclined positions, and/or a bed or lie-flat position. The aircraft seat 112 may be rotatable about an axis (e.g., swivelable). The aircraft seat 112 may be fully positionable between the outer limits of motion as defined by the moveable components of the aircraft seat 112, and/or other monuments of the side 102 and/or the side 104. It is noted herein a fully upright or raised position may be considered a taxi, takeoff, or landing (TTOL) position during select stages of flight (though the upright position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 112 may be actuatable (e.g., translatable and/or rotatable) from the TTOL position to a non-TTOL position, and/or vice versa.

An aircraft seat 112 may include one or more aircraft seat sections. For example, the aircraft seat 112 may include a primary section 114 and an auxiliary section 116. By way of another example, the aircraft seat 112 may include a single section. Generally, the aircraft seat 112 may include any number of sections.

Figure 2A:
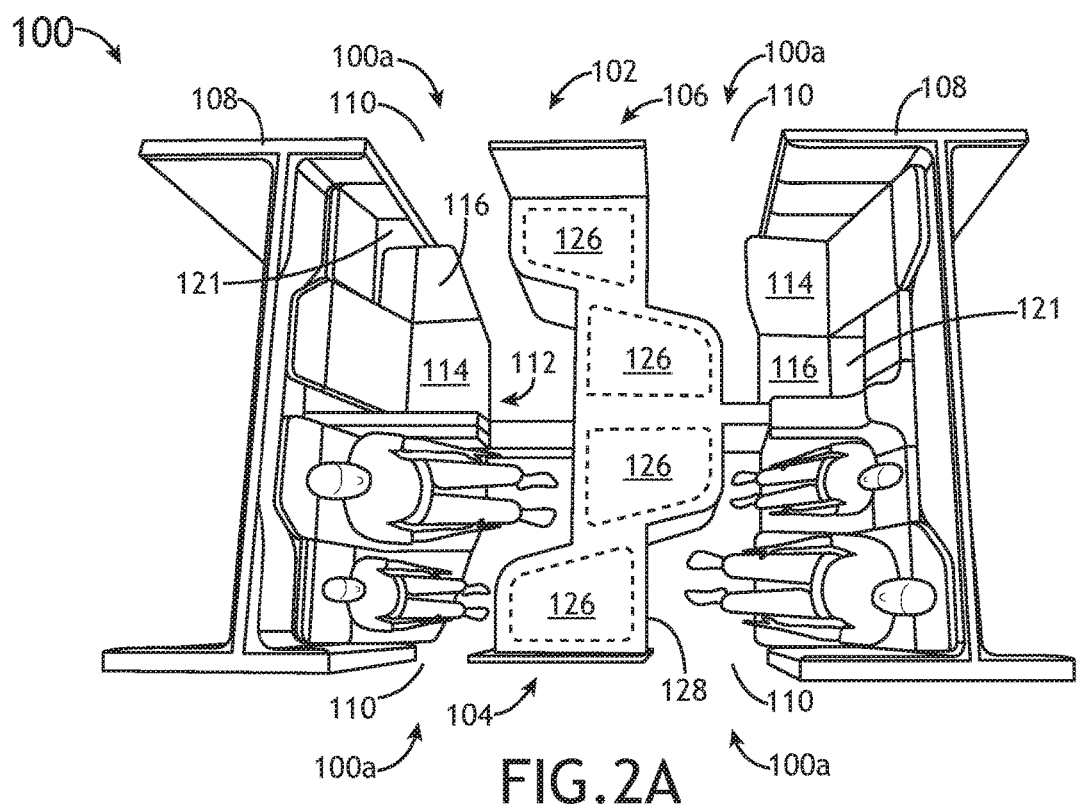
FIG. 2A illustrates an aircraft passenger compartment suite including a bench-back aircraft seat, in accordance with one or more embodiments of the disclosure.
Figure 2B:
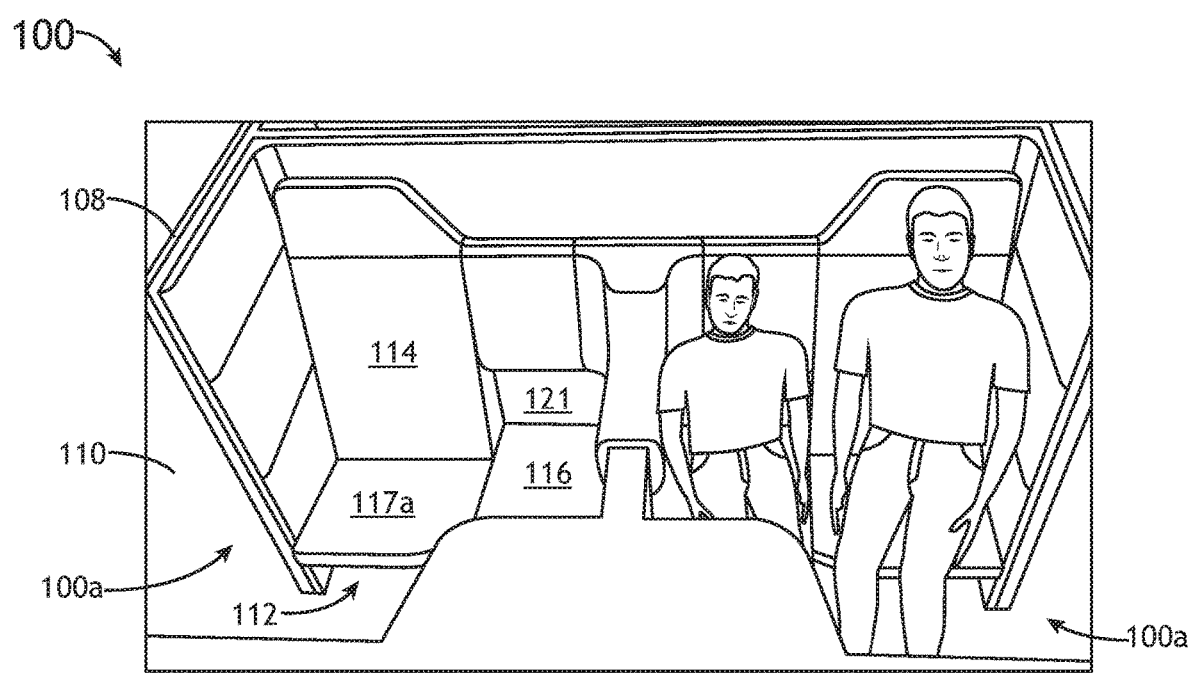
FIG. 2B illustrates an aircraft passenger compartment suite including a bench-back aircraft seat, in accordance with one or more embodiments of the disclosure.

As illustrated in at least FIGS. 2A and 2B, the primary section 114 and the auxiliary section 116 of the aircraft seat 112 may form a wide seating area or surface when the aircraft seat 112 is in the upright position, such that the aircraft seat 112 may be considered to include a bench-back. The wide seating area or surface may be configured to seat one or more passengers. The primary section 114 may be configured to seat a passenger occupying the aircraft passenger compartment suite 100 and the auxiliary section 116 may be configured to seat a guest passenger when the aircraft seat 112 is in the upright position (e.g., may operate as a buddy seat). It is noted herein the increased width of the aircraft seat 112 may provide for the aircraft passenger compartment suite 100 to be used as a shared, social environment by a guest passenger in addition to usage by the passenger occupying the aircraft passenger compartment suite 100.

Figure 2C:
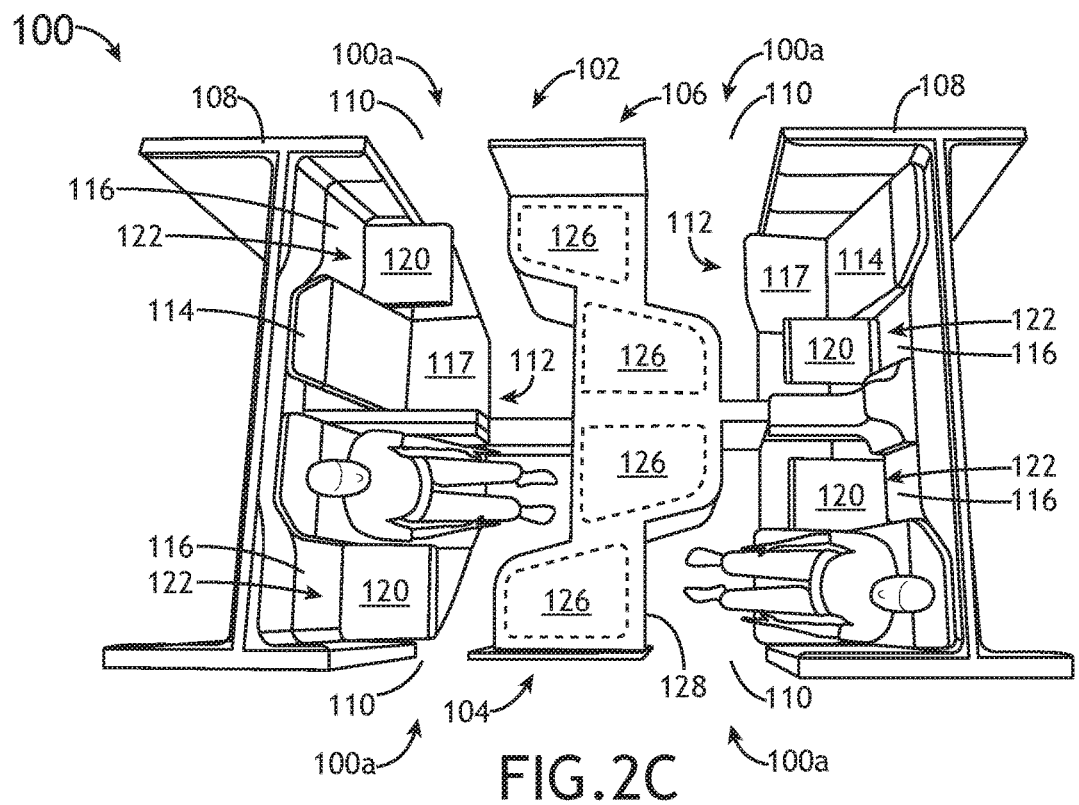
FIG. 2C illustrates an aircraft passenger compartment suite including a bench-back aircraft seat, in accordance with one or more embodiments of the disclosure.
Figure 2D:
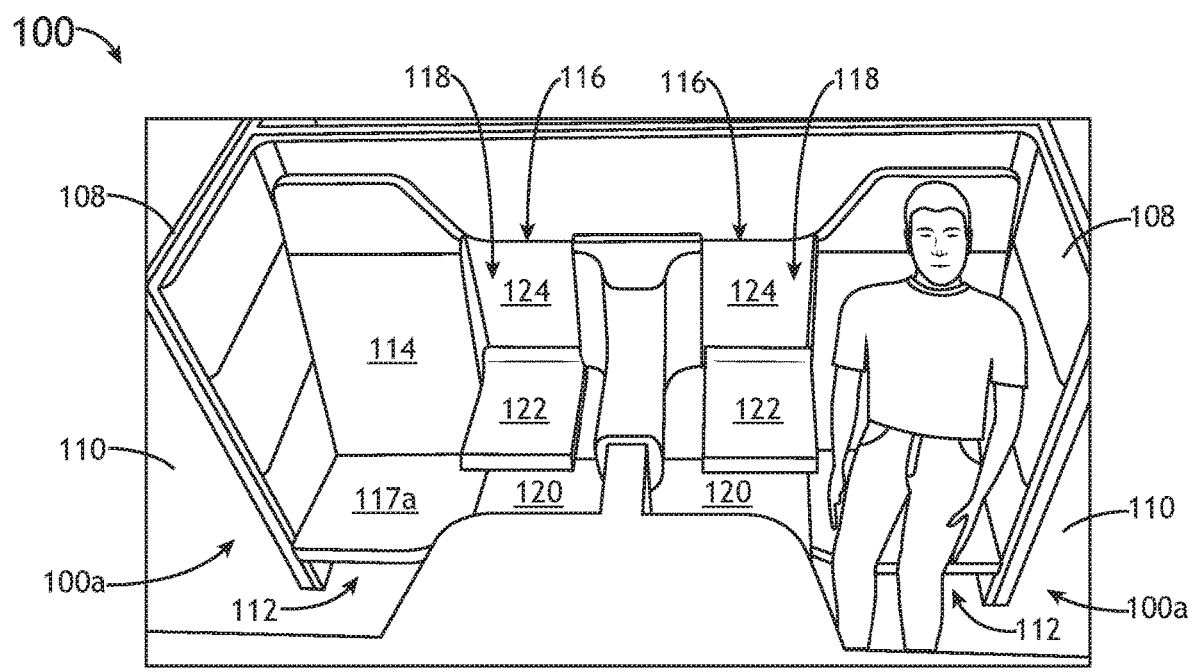
FIG. 2D illustrates an aircraft passenger compartment suite including a bench-back aircraft seat, in accordance with one or more embodiments of the disclosure.

As illustrated in at least FIGS. 2C and 2D, the auxiliary section 116 may include an auxiliary seatback portion 118 and an auxiliary seat base portion 120. The auxiliary seatback portion 118 may include an actuatable element 122. The actuatable element 122 may rotate and/or translate between a closed position and an open position. A stowage compartment (or storage compartment) 124 may be accessible within the aircraft seat 112 or a privacy shell element 108 proximate to the aircraft seat 112. For example, the stowage compartment 124 may be accessible when the actuatable element 122 is in the open position.

Figure 2E:
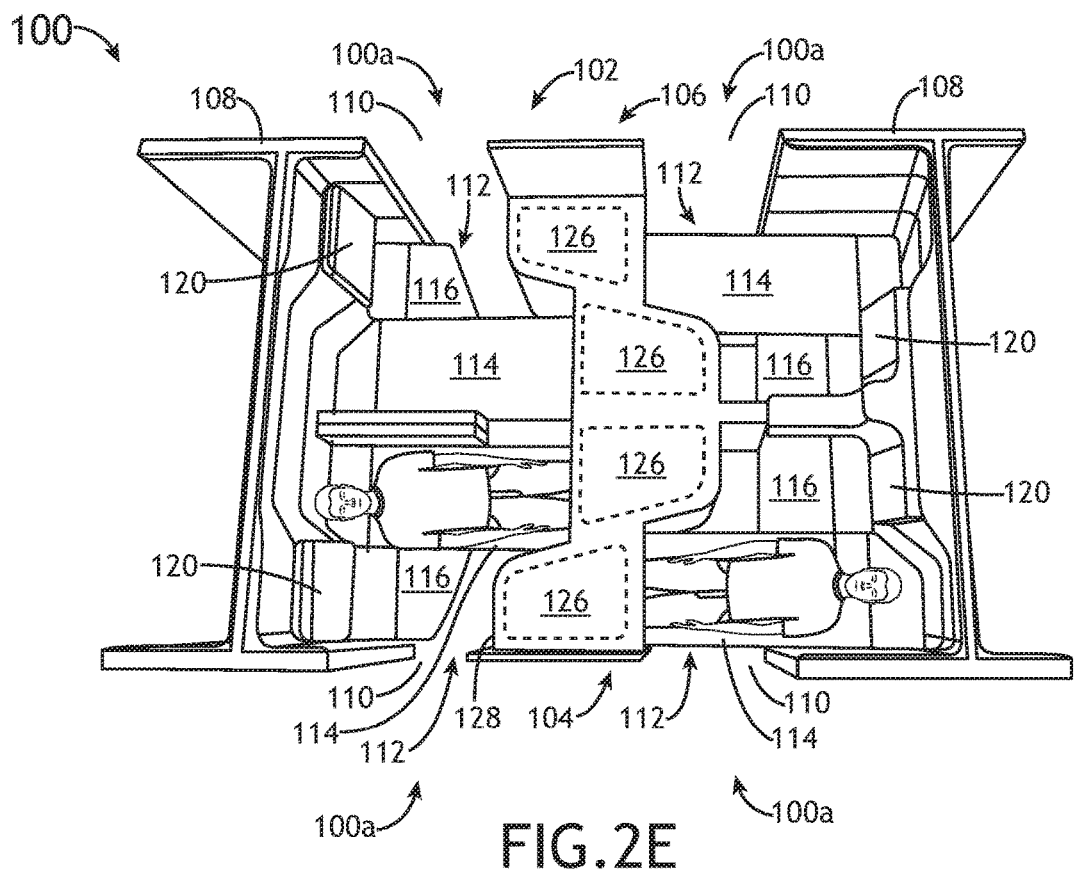
FIG. 2E illustrates an aircraft passenger compartment suite including a bench-back aircraft seat, in accordance with one or more embodiments of the disclosure.
Figure 2F:
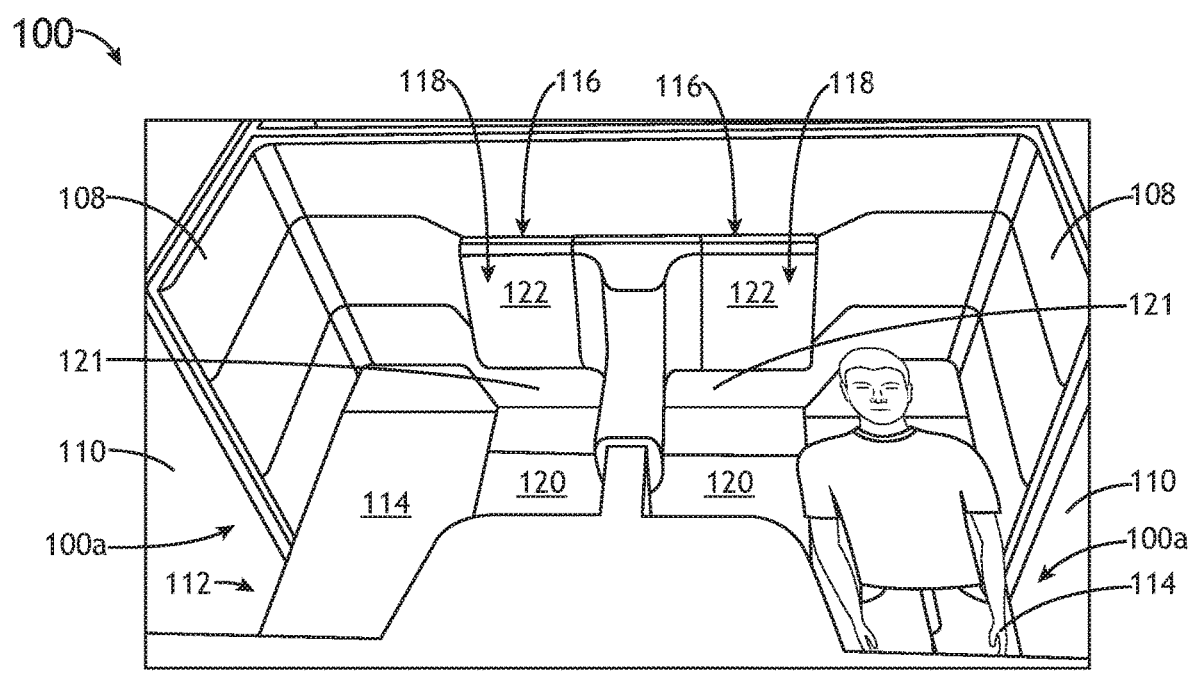
FIG. 2F illustrates an aircraft passenger compartment suite including a bench-back aircraft seat, in accordance with one or more embodiments of the disclosure.

As illustrated in at least FIGS. 2E and 2F, the aircraft seat 112 may be actuatable between the upright position and the lie-flat position. The primary section 114 may include an upper actuatable portion (e.g., an actuatable primary seatback portion, or the like) and/or a lower actuatable portion (e.g., an actuatable primary seat base portion, or the like). For example, the primary section 114 of the aircraft seat 112 may form a lie-flat area or surface when the aircraft seat 112 is in the lie-flat position. By way of another example, the primary section 114 and the auxiliary section 116 of the aircraft seat 112 may form a wide lie-flat area or surface when the aircraft seat 112 is in the lie-flat position. For instance, the wide lie-flat area or surface may provide increased width for portions of a passenger's upper body (e.g., torso, arms, shoulders, head, or the like). In addition, the wide lie-flat area or surface may provide an area to be used as a surface for the passenger's belongings (e.g., similar to a nightstand or end table).

The auxiliary section 116 of the aircraft seat 112 may be coupled to the primary section 114 of the aircraft seat 112. For example, the auxiliary section 116 of the aircraft seat 112 may include a full-length back coupled to the primary section 114 of the aircraft seat 112, where the entire full-length back actuates as a single section. By way of another example, the auxiliary section 116 of the aircraft seat 112 may include the auxiliary seat base portion 120 coupled to the primary section 114 of the aircraft seat 112 and the auxiliary seatback portion 118 (e.g., a portion including the actuatable element 122 and/or the stowage compartment 124) coupled to a privacy shell element 108 proximate to the aircraft seat 112, where the auxiliary seat base portion 120 and the auxiliary seatback portion 118 are split. For instance, the split may (non-limitingly) be along a horizontal or substantially horizontal line. In addition, the auxiliary seat base portion 120 of the auxiliary section 116 of the aircraft seat 112 may abut or be proximate to the auxiliary seatback portion 118 of the auxiliary section 116 of the aircraft seat 112 when the aircraft seat 112 is in the upright position. Further, a gap 121a, 121b may exist between the auxiliary seat base portion 120 of the auxiliary section 116 of the aircraft seat 112 coupled to the primary section 114 of the aircraft seat 112 (e.g., an air gap, a gap configured to hold a pillow for a passenger when the aircraft seat 112 is in the lie-flat position) and the auxiliary seatback portion 118 of the auxiliary section 116 of the aircraft seat 112. It is noted herein the gap 121a, 121b may represent a spacing between the auxiliary seat base portion 120 and the auxiliary seatback portion 118 of the auxiliary section 116 of the aircraft seat 112 (e.g., a spacing where a portion of a privacy shell element 108 be may observed). In addition, it is noted herein the gap may contribute to the wide lie-flat area or surface providing increased width for portions of a passenger's upper body (e.g., torso, arms, shoulders, head, or the like).

Figure 3A:
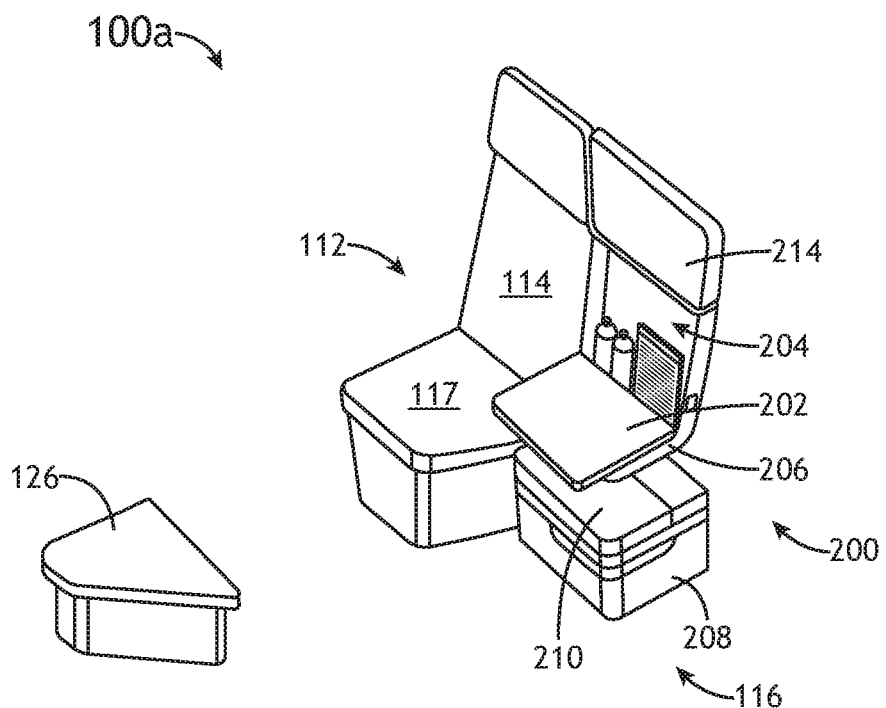
FIG. 3A illustrates an aircraft passenger compartment suite including a bench-back aircraft seat, in accordance with one or more embodiments of the disclosure.

As illustrated in at least FIG. 3A, the auxiliary section 116 may include an auxiliary seatback portion 200. The auxiliary seatback portion 200 of the auxiliary section 116 may include an actuatable element 202. The actuatable element 202 may rotate and/or translate between a closed position and an open position. A stowage compartment (or storage compartment) 204 may be accessible within the aircraft seat 112 or a privacy shell element 108 proximate to the aircraft seat 112. For example, the stowage compartment 204 may be accessible when the actuatable element 202 is in the open position.

Figure 3B:
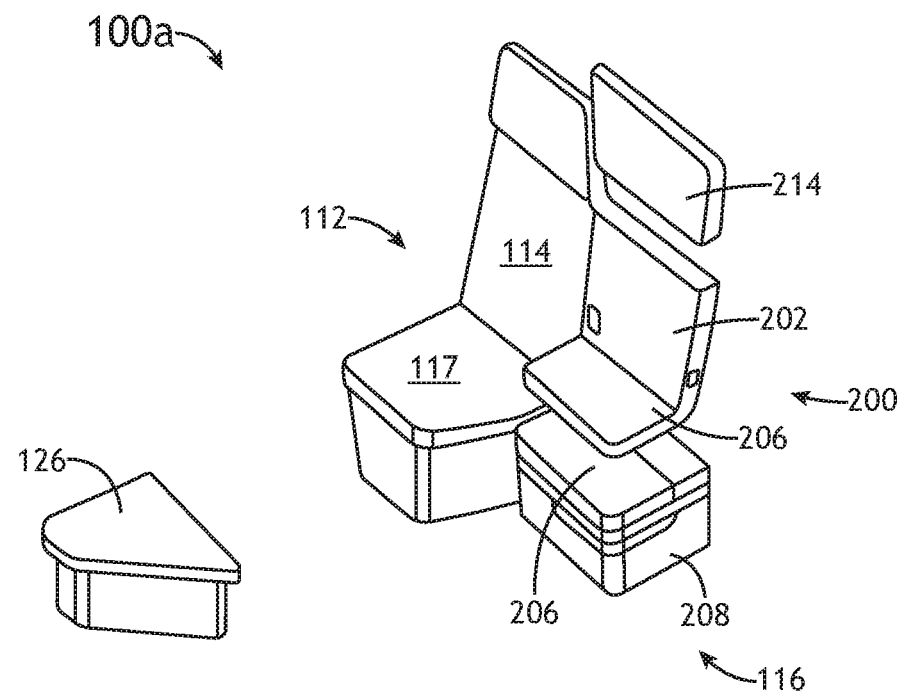
FIG. 3B illustrates an aircraft passenger compartment suite including a bench-back aircraft seat, in accordance with one or more embodiments of the disclosure.

As illustrated in at least FIGS. 3A and 3B, the auxiliary seatback portion 200 of the auxiliary section 116 may include an actuatable element 206. The actuatable element 206 may rotate and/or translate between a stowed position (or stored position) and a deployed position. For example, as illustrated in at least FIG. 3A, the actuatable element 202 may rest on the actuatable element 206 when the actuatable element 202 and the actuatable element 206 are each in the respective open or deployed positions. By way of another example, as illustrated in at least FIG. 3B, the auxiliary section 116 of the aircraft seat 112 may only include the actuatable element 206. Therefore, the above description should not be interpreted as a limitation on the present disclosure but merely an illustration.

Figure 3C:
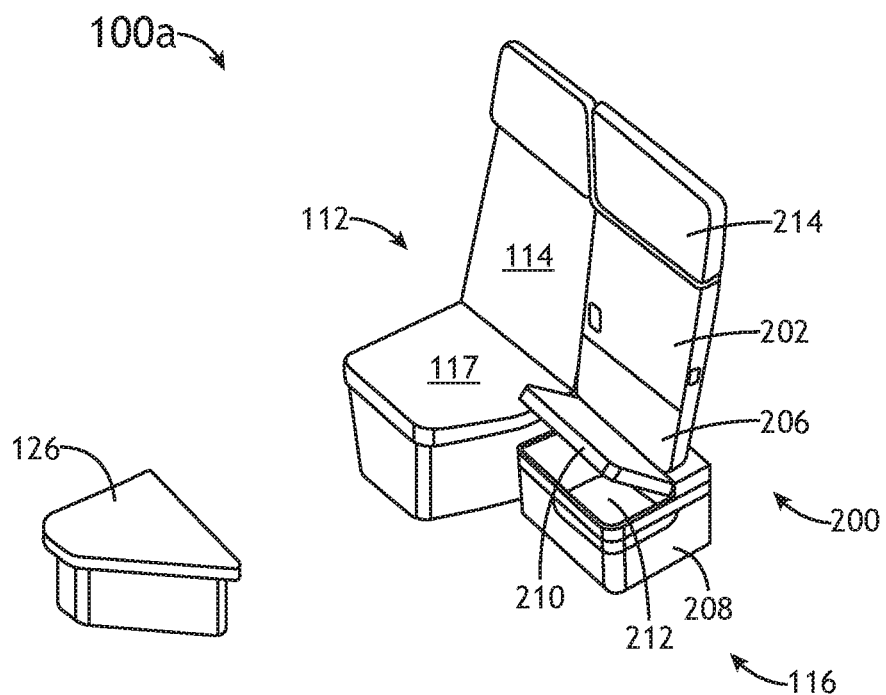
FIG. 3C illustrates an aircraft passenger compartment suite including a bench-back aircraft seat, in accordance with one or more embodiments of the disclosure.

As illustrated in at least FIG. 3C, the auxiliary section 116 may include an auxiliary seat base portion 208. The auxiliary seat base portion 208 may include an actuatable element 210. For example, the actuatable element 210 may form a part of a seating surface for a guest passenger occupying the auxiliary section 116 of the aircraft seat 112. The actuatable element 210 may rotate and/or translate between a closed position and an open position. A stowage compartment (or storage compartment) 212 may be accessible within the aircraft seat 112 or a privacy shell element 108 proximate to the aircraft seat 112. For example, the stowage compartment 212 may be accessible when the actuatable element 210 is in the open position.

Although embodiments of the present disclosure illustrate the auxiliary seat base portion 208 of the auxiliary section 116 of the aircraft seat 112 as being in use with the actuatable element 202 and the actuatable element 206 of the auxiliary section 116 of the aircraft seat 112 (e.g., as illustrated in FIGS. 3A-3F), it is noted herein the auxiliary seat base portion 208 of the auxiliary section 116 of the aircraft seat 112 may be used with any embodiment of the aircraft seat 112 as described throughout the disclosure. Therefore, the above description should not be interpreted as a limitation on the present disclosure but merely an illustration.

Figure 3D:
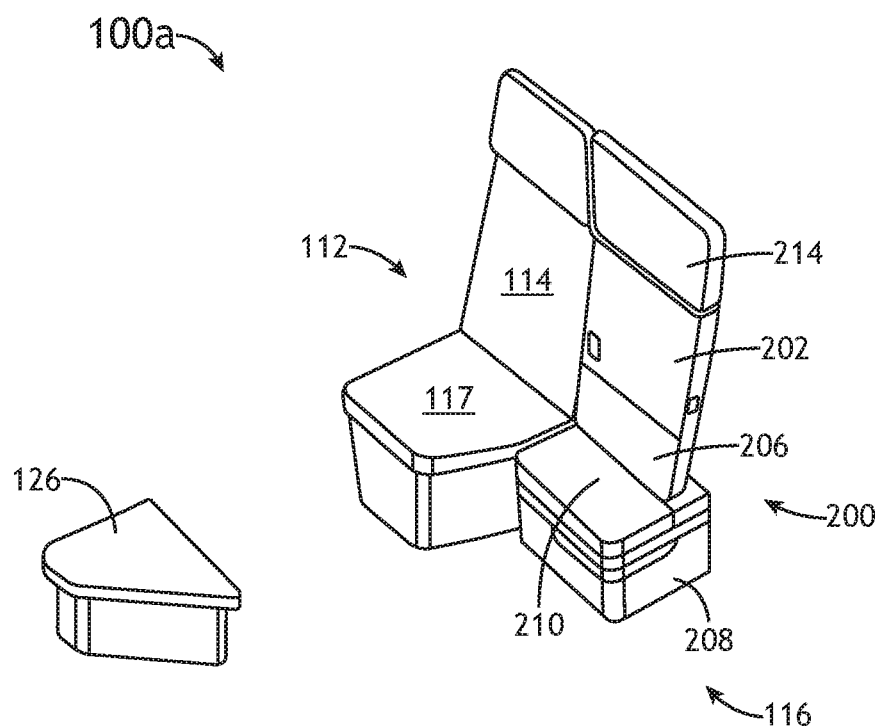
FIG. 3D illustrates an aircraft passenger compartment suite including a bench-back aircraft seat, in accordance with one or more embodiments of the disclosure.
Figure 3E:
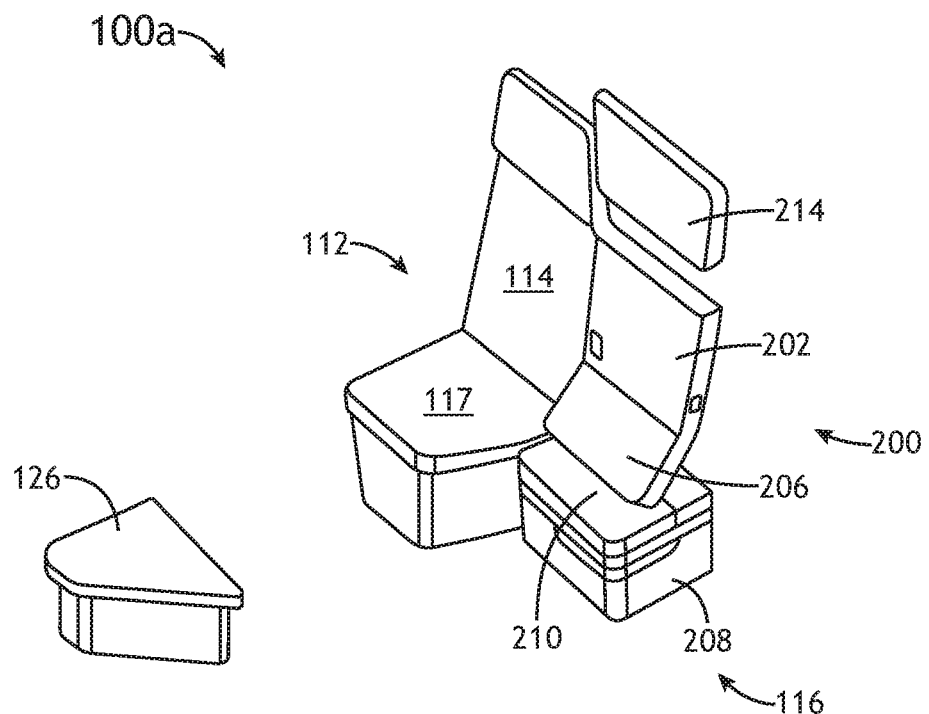
FIG. 3E illustrates an aircraft passenger compartment suite including a bench-back aircraft seat, in accordance with one or more embodiments of the disclosure.
Figure 3F:
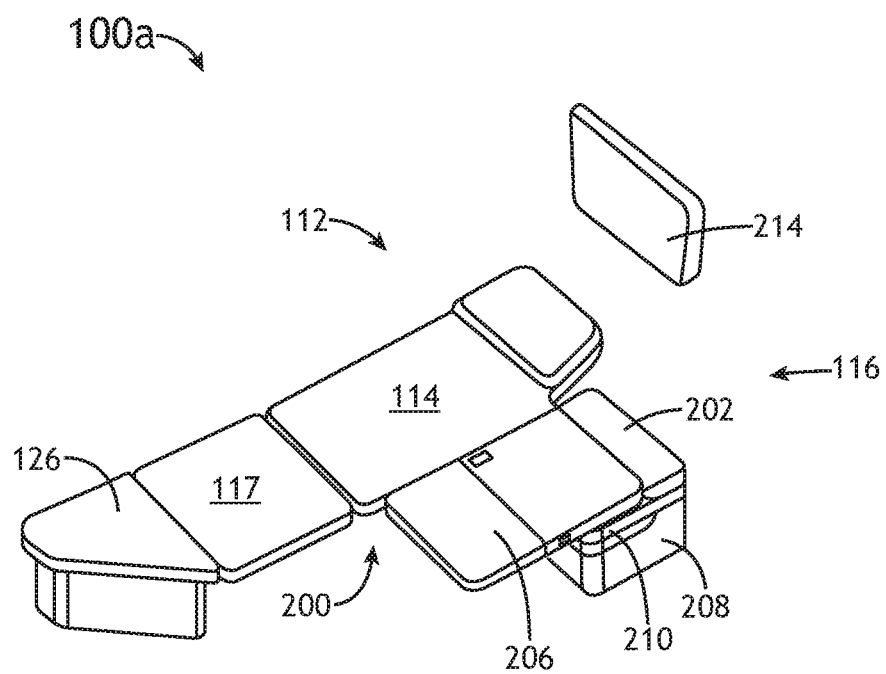
FIG. 3F illustrates an aircraft passenger compartment suite including a bench-back aircraft seat, in accordance with one or more embodiments of the disclosure.

As illustrated in at least FIGS. 3D-3F, the aircraft seat 112 may be actuatable from the upright position to the lie-flat position. The primary section 114 may include an upper actuatable portion (e.g., an actuatable primary seatback portion, or the like) and/or a lower actuatable portion (e.g., an actuatable primary seat base portion, or the like). For example, the primary section 114 of the aircraft seat 112 may form a lie-flat area or surface when the aircraft seat 112 is in the lie-flat position. By way of another example, the primary section 114 and the auxiliary section 116 of the aircraft seat 112 may form a wide lie-flat area or surface when the aircraft seat 112 is in the lie-flat position. For instance, the wide lie-flat area or surface may provide increased width for portions of a passenger's upper body (e.g., torso, arms, shoulders, head, or the like). In addition, the wide lie-flat area or surface may provide an area to be used as a surface for the passenger's belongings (e.g., similar to a nightstand or end table).

The auxiliary section 116 of the aircraft seat 112 may be coupled to the primary section 114 of the aircraft seat 112. For example, the auxiliary section 116 of the aircraft seat 112 may include a full-length back coupled to the primary section 114 of the aircraft seat 112. By way of another example, the auxiliary section 116 of the aircraft seat 112 may include the auxiliary seatback portion 200 coupled to the primary section 114 of the aircraft seat 112 (e.g., a portion including the actuatable element 202, the stowage compartment 204, and/or the actuatable element 206), and an upper portion 214 coupled to a privacy shell element 108 proximate to the aircraft seat 112 (e.g., a headrest, a second seat back portion, or the like), where the auxiliary seatback portion 200 and the upper portion 214 are split. For instance, the split may (non-limitingly) be along a horizontal or substantially horizontal line. In addition, the auxiliary seatback portion 200 of the auxiliary section 116 of the aircraft seat 112 may abut or be proximate to the upper portion 214 of the auxiliary section 116 of the aircraft seat 112 when the aircraft seat 112 is in the upright position. Further, a gap 121a, 121b may exist between the auxiliary seatback portion 200 of the auxiliary section 116 of the aircraft seat 112 coupled to the primary section 114 of the aircraft seat 112 (e.g., an air gap, a gap configured to hold a pillow for a passenger when the aircraft seat 112 is in the lie-flat position) and the upper portion 214 of the auxiliary section 116 of the aircraft seat 112. It is noted herein the gap 121a, 121b may be a spacing between the auxiliary seatback portion 200 and the upper portion 214 of the auxiliary section 116 of the aircraft seat 112, and not a stowage compartment within the aircraft seat 112 and/or the privacy shell element 108. In addition, it is noted herein the gap 121a, 121b may contribute to the wide lie-flat area or surface providing increased width for portions of a passenger's upper body (e.g., torso, arms, shoulders, head, or the like).

Although embodiments of the disclosure (e.g., as illustrated in FIGS. 2A-3F) are directed to the auxiliary section 116 of the aircraft seat 112 being coupled to and actuating with the primary section 114 of the aircraft seat 112, it is noted herein that the actuation of the auxiliary section 116 may be independent of the actuation of the primary section 114 where the primary section 114 and the auxiliary section 116 are split. For instance, the split may (non-limitingly) be along a vertical or substantially vertical line. Where actuation of the auxiliary section 116 of the aircraft seat 112 may result a gap 121a, 121b between the auxiliary seatback portion 200 and the upper portion 214 of the auxiliary section 116 when the aircraft seat 112 is in the lie-flat position, it is noted herein the independent actuation of the auxiliary section 116 may fill in the gap 121a, 121b to prevent access to the gap 121a, 121b by the passenger when the aircraft seat 112 is in the lie-flat position.

Figure 4A:
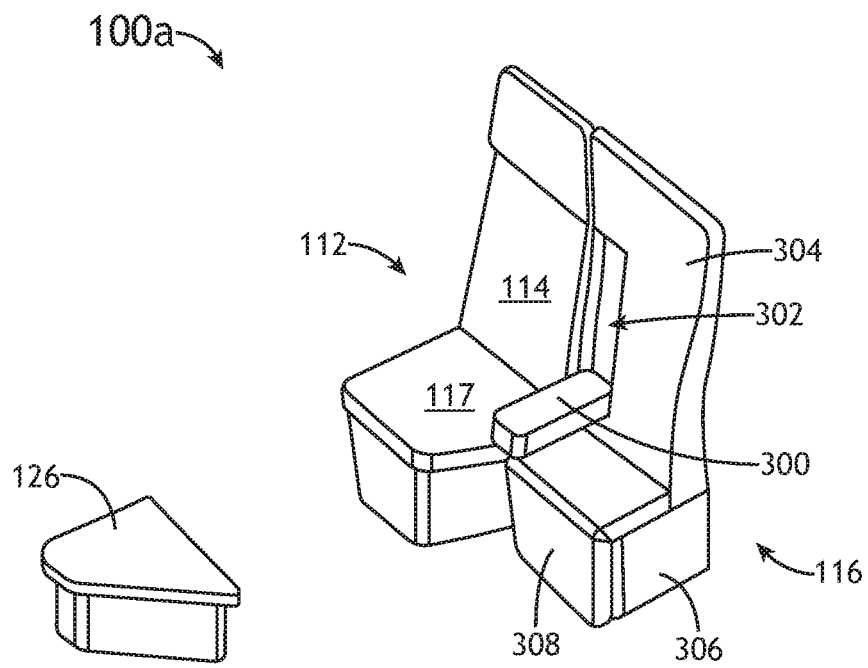
FIG. 4A illustrates an aircraft passenger compartment suite including a bench-back aircraft seat, in accordance with one or more embodiments of the disclosure.

As illustrated in at least FIG. 4A, the auxiliary section 116 may include an auxiliary seatback portion. The auxiliary seatback portion of the auxiliary section 116 may include an actuatable element 300. The actuatable element 300 may rotate and/or translate between a closed position and an open position. A stowage compartment 302 may be accessible within the aircraft seat 112 or a privacy shell element 108 proximate to the aircraft seat 112. For example, the stowage compartment 302 may be accessible when the actuatable element 300 is in the open position.

The actuatable element 300 may be set within a seatback portion 304 of the auxiliary section 116 of the aircraft seat 112. It is noted herein a width of the actuatable element 300 may only be a fraction of a width of the seatback portion 304 of the auxiliary section 116 of the aircraft seat 112, as opposed to being the entire width or substantially the entire width of the auxiliary section 116 of the aircraft seat 112 (e.g., as illustrated by the width of the actuatable element 202 and/or the actuatable element 206 in FIGS. 3A-3F).

Figure 4B:
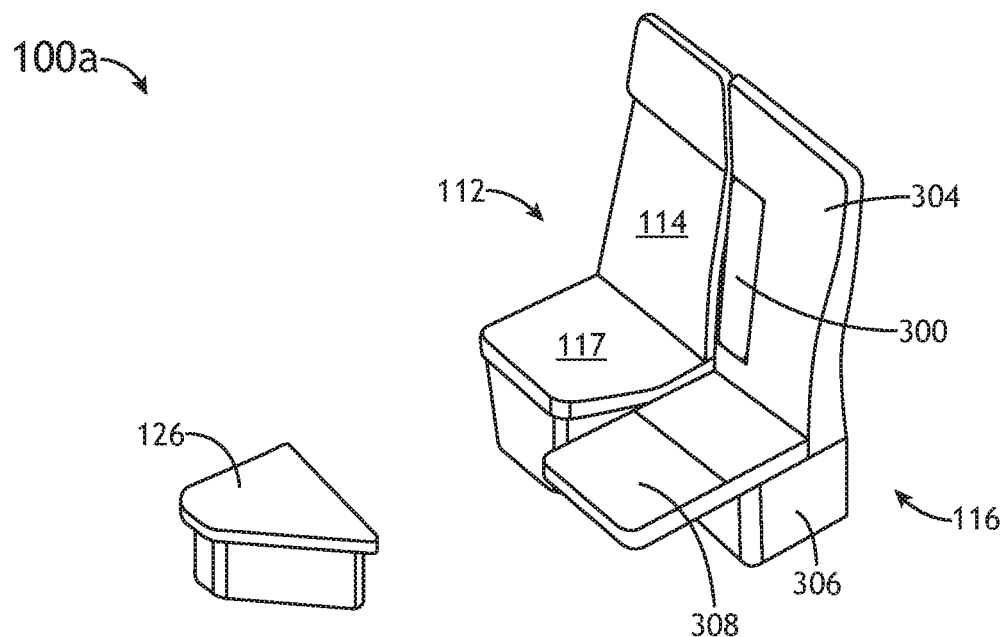
FIG. 4B illustrates an aircraft passenger compartment suite including a bench-back aircraft seat, in accordance with one or more embodiments of the disclosure.
Figure 4C:
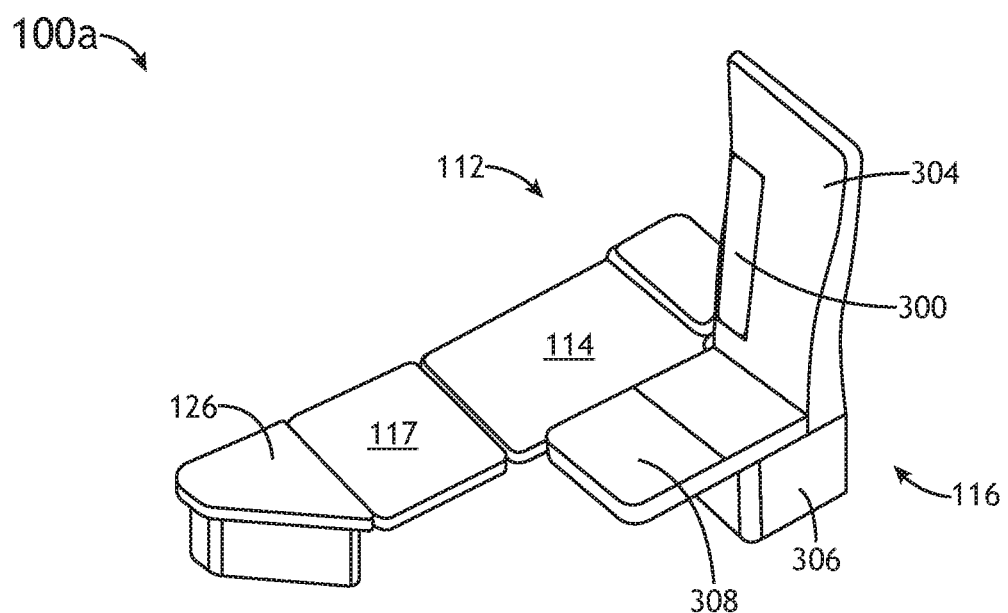
FIG. 4C illustrates an aircraft passenger compartment suite including a bench-back aircraft seat, in accordance with one or more embodiments of the disclosure.
Figure 5:
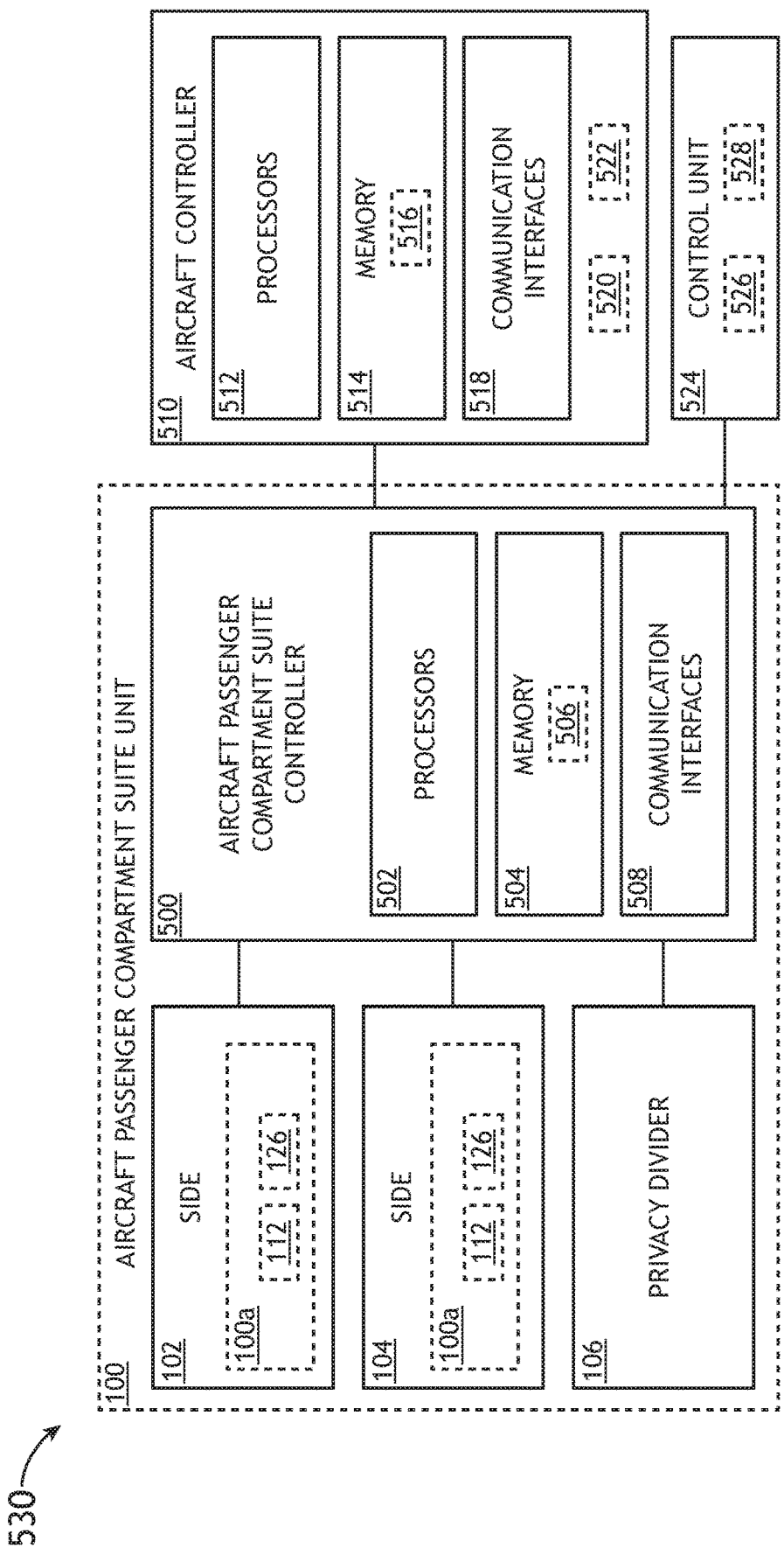
FIG. 5 illustrates a block diagram of an aircraft including an aircraft passenger compartment suite, in accordance with one or more embodiments of the disclosure.

As illustrated in at least FIGS. 4B and 4C, the auxiliary section 116 may include an auxiliary seat base portion 306. The auxiliary seat base portion 306 may include an actuatable element 308. For example, the actuatable element 308 may form a portion of a seating surface for a guest passenger occupying the auxiliary section 116 of the aircraft seat 112. The actuatable element 308 may rotate and/or translate between a stowed position (or stored position) and a deployed position.

It is noted herein the aircraft seat 112 or a privacy shell element 108 proximate to the aircraft seat 112 may include a stowage compartment (or storage compartment) accessible via the actuatable element 308 (e.g., similar to the auxiliary seat base portion 208 as illustrated in FIGS. 3A-3F). For example, the stowage compartment may be accessible when the actuatable element 308 is in the open position. Therefore, the above description should not be interpreted as a limitation on the present disclosure but merely an illustration.

Although embodiments of the present disclosure illustrate the auxiliary seat base portion 306 of the auxiliary section 116 of the aircraft seat 112 as being in use with the actuatable element 300 of the auxiliary section 116 of the aircraft seat 112 (e.g., as illustrated in FIGS. 4A-4C), it is noted herein the auxiliary seat base portion 306 of the auxiliary section 116 of the aircraft seat 112 may be used with any embodiment of the aircraft seat 112 as described throughout the disclosure. Therefore, the above description should not be interpreted as a limitation on the present disclosure but merely an illustration.

The aircraft seat 112 may be actuatable from the upright position to the lie-flat position. The primary section 114 may include an upper actuatable portion (e.g., an actuatable primary seatback portion, or the like) and/or a lower actuatable portion (e.g., an actuatable primary seat base portion, or the like). For example, the primary section 114 of the aircraft seat 112 may form a lie-flat area or surface when the aircraft seat 112 is in the lie-flat position. By way of another example, the primary section 114 and the auxiliary section 116 of the aircraft seat 112 may form a wide lie-flat area or surface when the aircraft seat 112 is in the lie-flat position. For instance, the wide lie-flat area or surface may provide increased width for portions of a passenger's upper body (e.g., torso, arms, shoulders, head, or the like). In addition, the wide lie-flat area or surface may provide an area to be used as a surface for the passenger's belongings (e.g., similar to a nightstand or end table).

The actuatable element 308 of the auxiliary section 116 of the aircraft seat 112 may be deployed as a wide extension to the primary section 114 of the aircraft seat 112 when the aircraft seat 112 is in the lie-flat position. For example, the actuatable element 308 of the auxiliary section 116 of the aircraft seat 112 may be deployed independently of the primary section 114 of the aircraft seat 112. It is noted herein, however, actuatable element 308 of the auxiliary section 116 of the aircraft seat 112 may be coupled to the primary section 114 of the aircraft seat 112 such that the actuation of the actuatable element 308 of the auxiliary section 116 of the aircraft seat 112 is dependent on the actuation of the auxiliary section 116.

It is noted herein that one or more of the actuatable elements 122, 202, 206, 210, 300, 308 may include an armrest, nightstand, end table, tray table, work surface, or the like for use by the passenger occupying the aircraft passenger compartment suite 100. For example, one or more of the actuatable elements 122, 202, 206, 210, 300, 308 may include or be covered with a cushion. By way of another example, one or more of the actuatable elements 122, 202, 206, 210, 300, 308 may be overmolded with a material (e.g., with rubber, foam, cloth, plastic, leather, or the like). By way of another example, one or more of the actuatable elements 122, 202, 206, 210, 300, 308 may be fabricated from a rigid material (e.g., plastic, veneer, or the like).

It is noted herein that one or more of the stowage compartments 124, 204, 212, 302 may be configured to receive and/or house (e.g., contain, secure, hold, or the like) one or more passenger amenities including, but not limited to, one or more pieces of carry-on luggage, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like. In addition, it is noted herein that one or more of the stowage compartments 124, 204, 212, 302 may include one or more electronic connections for one or more passenger amenities such as, but not limited to, one or more charging ports, one or more charging cables, or the like. Further, it is noted herein that one or more of the stowage compartments 124, 204, 212, 302 may include one or more electronic connections in communication with one or more components of the aircraft passenger compartment suite 100 such as, but not limited to, one or more display device connection ports, one or more display device connection cables, one or more audio output jacks (e.g., headphone jacks), one or more audio input jacks, or the like. Further, it is noted herein that one or more of the stowage compartments 124, 204, 212, 302 may include one or more safety devices (e.g., air masks, personal floatation devices, or the like).

The aircraft seat 112 (e.g., as illustrated in FIGS. 2A-4C) may be actuatable through a recline position from the upright position to the lie-flat position. For example, the primary section 114 of the aircraft seat 112 may form a reclined seating surface when the aircraft seat 112 is in the recline position. By way of another example, the primary section 114 and the auxiliary section 116 of the aircraft seat 112 may form a wide reclined seating area or surface when the aircraft seat 112 is in the recline position. Where the primary section 114 and the auxiliary section 116 may form the wide reclined seating area or surface, an actuation of the auxiliary section 116 may be dependent on an actuation of the primary section 114. It is noted herein, however, that the actuation of the auxiliary section 116 may be independent of the actuation of the primary section 114. Although embodiments of the disclosure illustrate the recline position being a transition point between the upright position and the lie-flat position, the recline position may be a separate position such that the aircraft seat 112 may transition from the upright position to the recline position or transition from the upright position to the lie-flat position).

Although embodiments of the present disclosure illustrate the auxiliary section 116 of the aircraft seat 112 being usable by a guest passenger when the aircraft seat 112 is in the upright position, it is noted herein the auxiliary section 116 of the aircraft seat 112 may be usable by the guest passenger when the aircraft seat 112 is in the recline position or the lie-flat position. Therefore, the above description should not be interpreted as a limitation on the present disclosure but merely an illustration.

As illustrated in at least FIGS. 2A, 2C, 2E, 3A-3F, and 4A-4C, the primary section 114 may be proximate to an ottoman 126 of the aircraft passenger compartment suite 100 when in the lie-flat position. The aircraft seat 112 and the ottoman 126 may form the lie-flat surface when the aircraft seat 112 and the ottoman 126 are each in a lie-flat position.

The ottoman 126 may be positioned underneath a monument 128 of the privacy divider 106. For example, a monument 128 may include, but are not limited to, a side stand, a tray or table, or the like. Where the monument 128 includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be static in position. It is noted herein, however, that the tray or table may be actuatable (e.g., may extend a select distance from a stowed position to an extended position proximate to a passenger).

The ottoman 126 may be positioned within a footwell of the aircraft passenger compartment suite 100. For instance, one or more dimensions of the footwell may be changed by transitioning the aircraft seat 112 between an upright position, a recline position, and/or the lie-flat position. It is noted herein that a portion of the ottoman 126 may be actuatable (e.g., along a set of tracks or linear rails) to a position outside of the footwell.

The ottoman 126 may be configured to translate and/or rotate about an axis through a sidewall of the ottoman to point a top surface to a passenger occupying the aircraft seat 112. For example, where the ottoman 126 may be configured to both translate and rotate, the ottoman 126 may be configured to independently rotate and/or translate. By way of another example, where the ottoman 126 may be configured to both translate and rotate, a rotation may prevent further translation until the ottoman 126 is returned to a select position and/or a translation may prevent further rotation until the ottoman 126 is returned to a select position.

It is noted herein, however, the aircraft seat 112 and/or the ottoman 126 may be limited to an upright position and/or one or more recline positions. In addition, it is noted herein the aircraft seat 112 may be the sole component forming a bed when the aircraft seat 112 is in a lie-flat position. Therefore, the above description should not be interpreted as a limitation on the present disclosure but merely an illustration.

The side 102 and/or the side 104 of the aircraft passenger compartment suite 100 may include one or more lights, one or more stowage compartments, and/or one or more passenger in-flight entertainment devices (IFEs). For example, the one or more IFEs may include, but are not limited to, one or more display devices.

Although embodiments of the disclosure illustrate components as being installed within and/or related to the side 102 or the side 104, it is noted herein any discussion about components installed within and/or related to the side 102 may be applied to the side 104, and vice versa. Therefore, the above description should not be interpreted as a limitation on the scope of the disclosure but merely an illustration.

FIG. 4 illustrates a block diagram of a passenger aircraft 430 including the aircraft passenger compartment suite 100, in accordance with one or more embodiments of the disclosure.

The passenger aircraft 430 may include one or more aircraft passenger compartment suite controllers 400 (e.g., in the aircraft passenger compartment suite 100). The one or more aircraft passenger compartment suite controllers 400 may include one or more processors 402 and memory 404. The memory 404 may store one or more sets of program instructions 406. The one or more processors 402 may be configured to execute the one or more sets of program instructions 406 to carry out one or more of the various steps described throughout the present disclosure. The one or more aircraft passenger compartment suite controllers 400 may include one or more communication interfaces 408.

The one or more aircraft passenger compartment suite controllers 400 may be coupled (e.g., physically and/or communicatively coupled) to one or more components in the side 102 (e.g., the aircraft seat 112, the ottoman 126, or other components of the side 102). The one or more aircraft passenger compartment suite controllers 400 may be coupled (e.g., physically and/or communicatively coupled) to one or more components in the side 104 (e.g., the aircraft seat 112, the ottoman 126, or other components of the side 104, actuatable element 122). The one or more aircraft passenger compartment suite controllers 400 may be coupled (e.g., physically and/or communicatively coupled) to components in the privacy divider 106.

The one or more aircraft passenger compartment suite controllers 400 may transmit instructions, power, control signals, data, or the like to the one or more components in the side 102, the side 104, and/or the privacy divider 106. The one or more aircraft passenger compartment suite controllers 400 may receive instructions, power, control signals, data, or the like from the one or more components in the side 102, the side 104, and/or the privacy divider 106.

The one or more aircraft passenger compartment suite controllers 400 may be coupled (e.g., physically and/or communicatively coupled) to one or more aircraft controllers 410. The one or more aircraft controllers 410 may include one or more processors 412 and memory 414. The memory 414 may store one or more sets of program instructions 416. The one or more processors 412 may be configured to execute the one or more sets of program instructions 416 to carry out one or more of the various steps described throughout the present disclosure. The one or more aircraft controllers 410 may include one or more communication interfaces 418.

The one or more aircraft controllers 410 may be coupled to one or more display devices 420. The one or more aircraft controllers 410 may be coupled to one or more user input devices 422.

The one or more aircraft passenger compartment suite controllers 400 may be coupled to a control unit 424. The control unit 424 may be coupled to one or more display devices 426. The control unit 424 may be coupled to one or more user input devices 428. The passenger control unit 424 may be positioned in the aircraft passenger compartment suite 100 for use by a passenger. The passenger control unit 424 may be positioned on an external surface of the aircraft passenger compartment suite 100 for use by a crew member.

It is noted herein the control unit 424 may be a component of the one or more aircraft passenger compartment suite controllers 400. In addition, it is noted herein the control unit 424 may be integrated in the one or more aircraft passenger compartment suite controllers 400. Further, it is noted herein the control unit 424 may be considered to include and/or be a passenger seat control unit, for purposes of the present disclosure.

The one or more processors 402, 412 may include any one or more processing elements known in the art. In this sense, the one or more processors 402, 412 may include any microprocessor device configured to execute algorithms and/or program instructions. In general, the term "processor" may be broadly defined to encompass any device having one or more processing elements, which execute a set of program instructions from a non-transitory memory medium (e.g., the memory 404, 414), where the one or more sets of program instructions 406, 416 are configured to cause the one or more processors 402, 412 to carry out any of one or more process steps.

The memory 404, 414 may include any storage medium known in the art suitable for storing the one or more sets of program instructions 406, 416 executable by the associated one or more processors 402, 412. For example, the memory 404, 414 may include a non-transitory memory medium. For instance, the memory 404, 414 may include, but is not limited to, a read-only memory (ROM), a random access memory (RAM), a magnetic or optical memory device (e.g., disk), a magnetic tape, a solid state drive, and the like. The memory 404, 414 may be configured to provide display information to the one or more display devices 420, 426. In addition, the memory 404, 414 may be configured to store user input information from the one or more user input devices 422, 428. The memory 404, 414 may be housed in a common controller housing with the one or more processors 402, 412. The memory 404, 414 may, alternatively or in addition, be located remotely with respect to the spatial location of the one or more processors 402, 412, the one or more aircraft passenger compartment suite controllers 400 and/or the one or more aircraft controllers 410. For instance, the one or more processors 402, 412, the one or more aircraft passenger compartment suite controllers 400, and/or the one or more aircraft controllers 410 may access a remote memory 404, 414 (e.g., server), accessible through a network (e.g., internet, intranet, and the like) via one or more communication interfaces.

The one or more communication interfaces 408, 418 may be operatively configured to communicate with one or more components of the aircraft passenger compartment suite controller 400 and/or the one or more components of the aircraft controller 410. For example, the one or more communication interfaces 408, 418 may also be coupled (e.g., physically, electrically, and/or communicatively) with the one or more processors 402, 412 to facilitate data transfer between components of the one or more components of the aircraft passenger compartment suite controller 400 and/or the one or more components of the aircraft controller 410 and the one or more processors 402, 412. For instance, the one or more communication interfaces 408, 418 may be configured to retrieve data from the one or more processors 402, 412, or other devices, transmit data for storage in the memory 404, 414, retrieve data from storage in the memory 404, 414, or the like. By way of another example, the aircraft controller 410 and/or one or more offboard controllers may be configured to receive and/or acquire data or information from other systems or tools by a transmission medium that may include wireline and/or wireless portions. By way of another example, the aircraft controller 410 and/or the one or more offboard controllers may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 410 and/or the one or more offboard controllers and the other subsystems (e.g., of the passenger aircraft 430 and/or the aircraft passenger compartment suite 100). In addition, the aircraft controller 410 and/or the one or more offboard controllers may be configured to send data to external systems via a transmission medium (e.g., network connection).

Although the present disclosure is directed to the one or more aircraft passenger compartment suite controllers 400 and the one or more aircraft controllers 410 being separate, it is noted herein the one or more aircraft passenger compartment suite controllers 400 and the one or more aircraft controllers 410 may be the same and/or share select components. Therefore, the above description should not be interpreted as a limitation on the present disclosure but merely an illustration.

The one or more display devices 420, 426 may include any display device known in the art. For example, the one or more display devices 420, 426 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices 420, 426 may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 422, 428 may include any user input device known in the art. For example, the one or more user input devices 422, 428 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 420, 426 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices 420, 426 being indirectly coupled to the corresponding one or more user input devices 422, 428 indirectly (e.g., via the one or more aircraft passenger compartment suite controllers 400 and/or the one or more aircraft controllers 410), it is noted herein the one or more display devices 420, 426 may be directly coupled to the corresponding one or more user input devices 422, 428. For example, the one or more display devices 420, 426 may be housed with the one or more user input devices 422, 428 in a common user interface housing. Therefore, the above description should not be interpreted as a limitation on the present disclosure but merely an illustration.

It is noted herein that any embodiments directed to the display devices 402, 426 and/or the user input devices 422, 428 may be directed to IFEs installed within the aircraft passenger compartment suite 100. Therefore, the above description should not be interpreted as a limitation on the present disclosure but merely an illustration.

Although embodiments of the present disclosure illustrate the actuation of components of the aircraft passenger compartment suite 100 via the control unit 424 (e.g., where the components are driven via a motor), it is noted herein that one or more components of the aircraft seat 112 may be actuated by engaging a handle that activates one or more analog mechanical assemblies. Therefore, the above description should not be interpreted as a limitation on the scope of the disclosure but merely an illustration.

Although the present disclosure is directed to the aircraft passenger compartment suite 100 being installed in the passenger aircraft 430, it is noted herein the aircraft passenger compartment suite 100 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

It is noted herein that one or more components of the aircraft passenger compartment suite 100 may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger compartment suite, comprising:
   a privacy shell; and
   an aircraft seat, the aircraft seat comprising:
   a primary section including a primary seatback portion and a primary seat base portion, wherein the primary section is configurable between an upright position and a lie-flat position;
   an auxiliary section including an auxiliary seatback portion and an auxiliary seat base portion, wherein the primary seat base portion and the auxiliary seat base portion are configured to form a combined seat base portion when the primary section is in the upright position, wherein the auxiliary seatback portion is coupled to the privacy shell;

an actuatable element configured to actuate between an open position and a closed position, the actuatable element comprising:
- a first surface which defines at least a portion of the auxiliary seatback portion when the actuatable element is in the closed position; and
- a second surface which defines a surface of an armrest when the actuatable element is in the open position; and a stowage compartment disposed within the auxiliary seatback portion, the stowage compartment positioned adjacent to the primary seatback portion of the primary section of the aircraft seat when the primary section is in the upright position and the actuatable element is in the open position;

wherein the auxiliary seat base portion and the primary seatback portion are adjacent when the primary section is in the lie-flat position, wherein the auxiliary seat base portion includes a second actuatable element configured to rotate for extending the auxiliary seat base portion and forming a lie-flat surface with the primary seatback portion when the primary section is configured in the lie-flat position.

2. The aircraft passenger compartment suite of claim 1, wherein the first surface is at least partially defined by a dress cover.

3. The aircraft passenger compartment suite of claim 1, wherein the second surface includes dress cover surface defining the surface of the armrest.

4. The aircraft passenger compartment suite of claim 3, wherein at least a portion of the second surface is defined by a desk surface made up of at least one of a plastic, wood, or metal surface.

5. The aircraft passenger compartment suite of claim 1, wherein the second surface includes a cup holder.

6. The aircraft passenger compartment suite of claim 1, wherein the first surface of the actuatable element is substantially flush with the primary seatback portion when the actuatable element is in the closed position and the primary section is in the upright position.

7. The aircraft passenger compartment suite of claim 1, the actuatable element configured to pivot between the open position and the closed position.

8. The aircraft passenger compartment suite of claim 1, wherein the actuatable element is configured to provide access to the stowage compartment when the actuatable element is in the open position.

9. The aircraft passenger compartment suite of claim 1, the stowage compartment configured to house at least one of one or more passenger amenities, one or more electronic connections for one or more passenger amenities, one or more electronic connections in communication with one or more components of the aircraft passenger compartment suite, or one or more safety devices.

10. The aircraft passenger compartment suite of claim 1, wherein the auxiliary seatback portion is separated from the auxiliary seat base portion by a gap configured to receive a pillow when the actuatable element is in the open position and the closed position.

11. The aircraft passenger compartment suite of claim 10, wherein the auxiliary seat base portion extends past the primary seatback portion a distance equivalent to a depth of the gap.

12. The aircraft passenger compartment suite of claim 1, a width of the actuatable element being equal to a width of the auxiliary seatback portion.

13. The aircraft passenger compartment suite of claim 1, a width of the actuatable element being less than a width of the auxiliary seatback portion.

14. An aircraft seat for an aircraft passenger compartment suite, comprising:
- a primary section including a primary seatback portion and a primary seat base portion, wherein the primary section is configurable between an upright position and a lie-flat position;
- an auxiliary section disposed adjacent to the primary section of the aircraft seat, the auxiliary section including:
  - an auxiliary seatback portion including a first actuatable element disposed within the auxiliary seatback portion configured to actuate between an open position and a closed position, the first actuatable element configured to provide access to a first stowage compartment when the first actuatable element is in the open position, the first stowage compartment positioned adjacent to the primary seatback portion of the primary section; and
  - an auxiliary seat base section including a second actuatable element, the second actuatable element configured to actuate between an open position and a closed position, the second actuatable element configured to provide access to a second stowage compartment when the second actuatable element is in the open position;
- wherein the auxiliary seatback portion is coupled to the primary seatback portion to actuate as a single section for forming a lie-flat surface with the primary section when the primary section is configured in the lie-flat position.

15. The aircraft seat of claim 14, wherein the auxiliary seatback portion includes a third actuatable element configured to actuate between a stowed position and a deployed position; wherein the first actuatable element is configured to rest on the third actuatable element when the first actuatable element is in the open position and the third actuatable element is in the deployed position.

* * * * *